Oct. 11, 1932.   C. L. LYTTON   1,882,366
TRAVELING FAN
Filed Nov. 17, 1930

Inventor
Cullen L. Lytton
By Dubois & Davis
Attorneys

Patented Oct. 11, 1932

1,882,366

UNITED STATES PATENT OFFICE

CULLEN L. LYTTON, OF EAST GASTONIA, NORTH CAROLINA, ASSIGNOR TO PARKS-CRAMER COMPANY, OF FITCHBURG, MASSACHUSETTS, A CORPORATION OF MASSACHUSETTS

TRAVELING FAN

Application filed November 17, 1930. Serial No. 496,301.

This invention has relation to that type of traveling fans used for ventilation and other purposes in which the combined motor and fan travel on a pair of endless parallel rails which serve as electric conductors, the current passing into the wheels running on the tracks and thence into the motor to the end that the combined fan and motor will not only travel continuously along the rails but will rotate the fan, as more fully hereinafter set forth.

In the drawing annexed:

Figure 1:
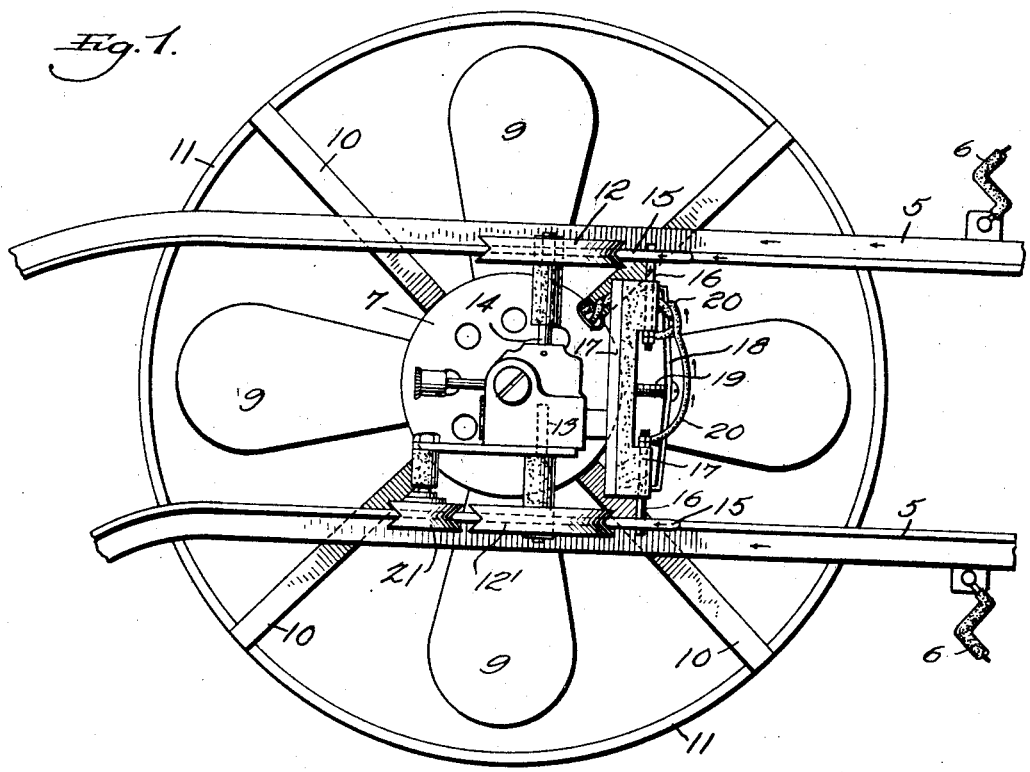
Fig. 1 is a plan view of my apparatus and a portion of the track or rails.
Figure 2:
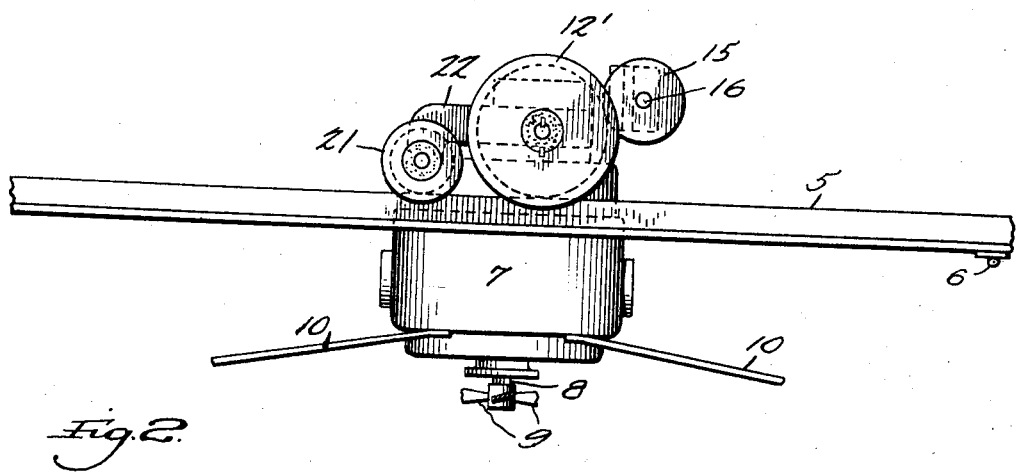
Fig. 2 is a side elevation thereof.

Referring to the drawing annexed, by reference characters, 5 designates the parallel rails to each of which is connected one of the electric conductors 6. The electric motor is designated 7 and its fan shaft 8, this fan shaft carrying the fan blades 9 which face downwardly, the plates being desirably enclosed in a suitable cage consisting of radial bars 10 and a ring 11. The combined motor and fan are supported by a pair of grooved wheels 12, 12' which rest on the rails 5. The wheel 12' is supported insulatedly on a shaft 13 affixed to the motor casing, while the other wheel 12 is insulatedly affixed to a rotatable shaft 14 driven by the usual motor gearing, not shown. Through this wheel 12 the apparatus is caused to move on track rails when the motor is driven.

The current is taken off both supporting wheels 12, 12' to a pair of contact wheels 15 which run in the grooves of the supporting wheels and are rotatably mounted on pins 16 affixed to a block of insulation 17 which block is affixed to a plate 17 carried by the motor frame. This insulating block 17 is clamped to the plate 17 by a bar 18 and a screw 19. The lead-in wires 20 of the motor are electrically connected to the inner ends of the pins 16. With this construction it will be observed that when current is applied to the rails 5 it will enter the motor through one of the wheels 12 or 12' to one of the contact wheels 15 and thence through one of the lead-in wires 20, out through the other lead-in wire and thence through the other connected contact wheel 15 to the other traction wheel 12. In this simple way the combined motor and fan will be caused to travel along the rails and at the same time propel the fan.

One of the wheels, in this instance 12', is mounted to rotate loosely on its stub shaft 13 so that the apparatus may freely pass around the curves in the trackway, and in order to guide the apparatus in passing around the curves in the trackway I provide a guiding roller 21 which lies in front of the roller 12' and is supported insulatedly on the motor casing by an arm 22.

I claim:

1. An apparatus of the class set forth, with a pair of conductor rails, a combined fan and motor mounted on said rails through the medium of a pair of wheels one of which is driven from the motor and the other of which rotates freely, a pair of contact wheels having contact with said wheels and insulated from the motor frame, and lead-in wires for the motor connected to said contact wheels.

2. An apparatus of the class set forth, with a pair of conductor rails, a combined fan and motor mounted on said rails through the medium of a pair of wheels one of which is driven from the motor and the other of which rotates freely, a pair of contact wheels having contact with said wheels and insulated from the motor frame, and lead-in wires for the motor connected to said contact wheels, a grooved wheel being provided for guiding the apparatus around the track, said grooved wheel being mounted in front of one of the aforesaid wheels and insulatedly mounted on the motor frame.

In testimony whereof I hereunto affix my signature.

CULLEN L. LYTTON.